Feb. 28, 1950  M. MASCOLO  2,498,693
JIG
Filed Jan. 29, 1946
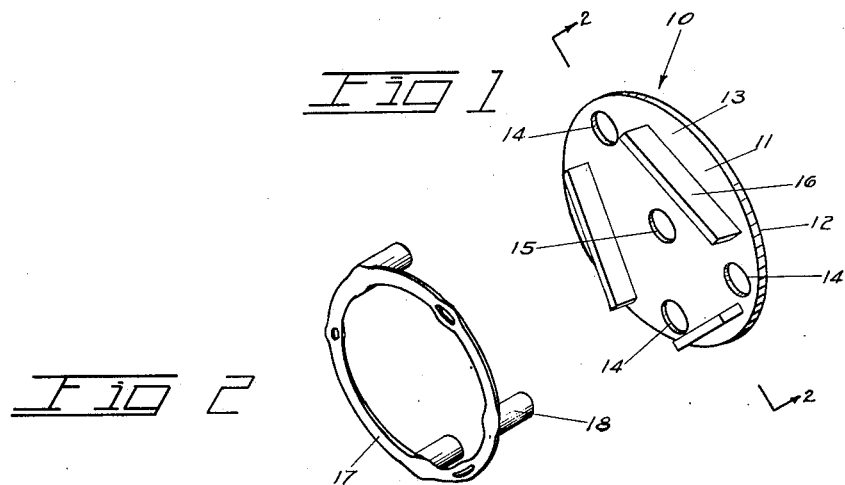
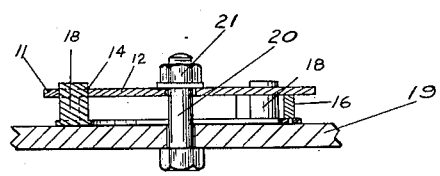
INVENTOR.
MARIO MASCOLO.
BY
ATTORNEY Patented Feb. 28, 1950

2,498,693

UNITED STATES PATENT OFFICE 2,498,693

JIG

Mario Mascolo, New York, N. Y.

Application January 29, 1946, Serial No. 644,013

3 Claims. (Cl. 90—59)

(Granted under the act of March 3, 1883, as amended April 30, 1928; 370 O. G. 757)

The present invention concerns a jig for use in conjunction with a machine such as a milling machine to clamp the work in place relative to the machine and to guide the machine tool.

An object of this invention is to provide a jig that serves as a combination work holder and tool guide in connection with a machine such as a milling machine.

Further objects and advantages of this invention as well as its construction, arrangement and operation, will be apparent from the following description and claims in connection with the accompanying drawings, in which Fig. 1 is an isometric view of a preferred embodiment of the invention.

Fig. 2 is an isometric view of a piece of work of the type adapted to be clamped by the jig of the invention.

Fig. 3 is a sectional view showing the jig of Fig. 1 and the workpiece of Fig. 2 assembled together on a milling machine.

The jig is of table-like construction and comprises a disc-shaped portion 11 having a flat upper surface 12 and a parallel flat bottom surface 13.

Three openings 14 are provided in spaced relation about the periphery of disc 11. A central opening is provided as indicated at 15.

Formed integrally on the bottom surface of disc 11 and dependent therefrom are a series of legs 16, each of which is in the form of a right rectangular prism. The legs are disposed in chordal relation between openings 14.

The jig is designed for use with a piece of work such as shown in Fig. 2, which consists of a mounting ring 17 having a series of spaced legs 18. When assembled for operation as seen in Fig. 3, legs 18 extend through openings 14 in disc 11 with the extremities thereof extending above face 12 of disc 11 and exposed so that a tooling operation can be performed thereon. When so assembled, legs 16 rest upon ring 17 between legs 18, and the assembly rests upon a bedplate 19 of a machine (not shown) such as a milling machine. A bolt 20 extends through bedplate 19, ring 17 of the workpiece and central opening 15 of the jig. A nut 21 secures the assembly firmly in place.

In operation jig 10 serves the dual function of clamping workpiece 17 securely in place upon bedplate 19, and further serves as a tool guide during the operation in which the extremities of workpiece legs 18 are tooled.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A jig for clamping against a support a workpiece having a ring-shaped base and a plurality of spaced legs on the ring, said jig comprising a plate-like portion having a periphery, said portion being formed near the periphery with a plurality of spaced holes extending therethrough and adapted to receive the legs of the workpiece, said portion being formed with a centrally-located hole extending therethrough and adapted to receive a bolt for locking the jig and workpiece relative to the support, and a plurality of spaced legs on the portion, said legs being located near the portion periphery between the spaced holes and adapted to clamp the workpiece against the support, said jig legs being disposed so that lateral access to the region bounded by said legs and portion can be had through the space between said legs.

2. A jig for clamping against a support a workpiece having a ring-shaped base and a plurality of spaced legs on the ring, said jig comprising a plate-like, disc-shaped portion having a periphery, said portion being formed near the periphery with a plurality of spaced holes extending therethrough and adapted to receive the legs of the workpiece, said portion being formed with a centrally-located hole extending therethrough, a plurality of spaced legs on the portion, said legs being located near the periphery between the spaced holes and adapted to clamp the workpiece against the support, said jig legs being disposed so that lateral access to the region bounded by said legs and portion can be had through the space between said legs, and a bolt extending through the central jig hole and workpiece ring to lock the jig and workpiece relative to the support.

3. A jig for clamping against a support a workpiece having a body and a plurality of spaced legs on the body, said jig comprising a portion having a periphery, said portion being formed near the periphery with a plurality of spaced holes extending therethrough and adapted to receive the legs of the workpiece, said portion being formed with a substantially centrally-located hole extending therethrough and adapted to receive means for locking the jig and workpiece relative to the support, and a plurality or spaced legs on the portion, said legs being located near the portion periphery between the spaced holes and adapted to clamp the workpiece against the support, said jig legs being disposed so that lateral access to the region bounded by said legs and portion can be had through the space between said legs.

MARIO MASCOLO.

REFERENCES CITED

The following references are of record in the file of this patent:

UNITED STATES PATENTS

| Number | Name | Date |
|---|---|---|
| 1,445,016 | Golembiewski | Feb. 13, 1923 |
| 1,712,453 | Bieder | May 7, 1929 |
| 1,721,648 | Swartz | July 23, 1929 |